United States Patent [19]

Sato

[11] Patent Number: 4,699,526
[45] Date of Patent: Oct. 13, 1987

[54] SEALING DEVICE FOR BEARINGS

[75] Inventor: Masao Sato, Fukushima, Japan

[73] Assignee: NOK Corporation, Tokyo, Japan

[21] Appl. No.: 890,226

[22] Filed: Jul. 29, 1986

[30] Foreign Application Priority Data

Aug. 1, 1985 [JP] Japan .......................... 60-118361[U]
Dec. 19, 1985 [JP] Japan .......................... 60-195368[U]

[51] Int. Cl.$^4$ .......................... F16C 33/76; F16J 15/32
[52] U.S. Cl. .................................... 384/486; 277/153;
277/166; 384/477
[58] Field of Search ............... 384/147, 148, 477, 479,
384/481–486, 488, 489; 277/152, 153, 166

[56] References Cited

U.S. PATENT DOCUMENTS

| | | | |
|---|---|---|---|
| 3,685,838 | 8/1972 | Malmstrom | 384/484 |
| 3,790,238 | 2/1974 | Otto | 384/486 |
| 3,921,992 | 11/1975 | Bertin | 277/153 |
| 4,166,628 | 9/1979 | Blaydon | 277/152 |
| 4,210,339 | 7/1980 | Povejsil | 277/153 |
| 4,588,195 | 5/1986 | Antonini et al. | 277/153 |
| 4,616,837 | 10/1986 | Beutel | 277/153 |

Primary Examiner—Stuart S. Levy
Assistant Examiner—Thomas R. Hannon
Attorney, Agent, or Firm—Pennie & Edmonds

[57] ABSTRACT

A sealing device which is fitted between the outer and inner races of a bearing has a sealing lip portion comprised of a first sealing lip positioned closer to the outer side of the bearing which is exposed to the atmosphere and a second sealing lip positioned closer to the interior of the bearing which is to be filled with oil. Both the first and second sealing lips are respectively provided with first and second sealing portions each of which is formed by the intersection between a first inclined surface inclined with respect to the axis of rotation of the bearing in such a manner that the degree of inclination thereof increases toward the outer side of the bearing and a second inclined surface inclined with respect to the axis of rotation of the bearing in such a manner that the degree of inclination thereof increases toward the interior of the bearing. The angle formed by the first inclined surface and the mating peripheral surface of the inner race of the bearing is set at a value which is larger than the angle formed by the second inclined surface and the mating peripheral surface of the inner race. The second sealing lip is provided with an axially hollowed annular recess formed in a lateral surface portion thereof at the back of the second sealing portion thereof.

6 Claims, 4 Drawing Figures

SEALING DEVICE FOR BEARINGS

BACKGROUND OF THE INVENTION

1. Field of the Invention

The present invention relates to a sealing device such as an oil seal for use in bearings such as ball bearings.

2. Description of the Prior Art

FIG. 4 shows an example of a known sealing device for a bearing which was disclosed in Japanese Utility Model Registration Publication No. 54-34090.

As shown in FIG. 4, the bearing 103 comprises an outer race 100, an inner race 101 arranged parallel to the outer race with a predetermined gap L therebetween, and a ball 102 interposed between the races 100 and 101. An oil seal 104 of the type which has metal on its radially outward periphery is forced in the gap L of the bearing 103 so as to keep the oil-filled interior of the bearing 103 sealed off from the atmosphere.

More specifically, the oil seal 104 comprises a metal ring 105 and a seal body 106 made of rubber and heat-bonded to the peripheral surface of the metal ring 105. The seal body 106 has a sealing lip portion 107 which is also made of a rubbery elastic material and formed integrally therewith. Further, the sealing lip portion 107 is provided with a first sealing lip 108 and a second sealing lip 109 branching therefrom. The first sealing lip 108 extends toward the outer side X of the bearing 103 which is exposed to the atmosphere, and the second sealing lip 109 extends toward the interior Y of the bearing 103.

The first sealing lip 108 has a sealing portion 112 formed at the intersection between a first inclined surface 110 and a second inclined surface 111, both of which face the inner race 101. The inclination of the surfaces is with respect to the rotational axis of the bearing 103. The degree of inclination of the first inclined surface 110, i.e. the angle $\alpha$ formed by the first inclined surface 110 and the mating surface of the inner race 101 is set at a value larger than the degree of inclination of the second inclined surface 111, i.e. the angle $\beta$ formed by the second inclined surface 111 and the mating surface of the inner race 101. Therefore, the above arrangement of the first sealing lip 108 of the oil seal 104 disclosed is capable of substantially preventing penetration of dust, etc. from the outer side X of the bearing which is exposed to the atmosphere, but it cannot prevent flow of oil, e.g. grease, from the interior Y of the bearing 103 which is filled with oil.

On the other hand, the second sealing lip 109 has a sealing portion 115 formed at the intersection between a first inclined surface 113 and a second inclined surface 114, both of which face the inner race 101. The inclination of the surfaces is with respect to the rotational axis of the bearing 103. The angle $\alpha'$ formed by the first inclined surface 113 and the mating surface of the inner race 101 is set a value smaller than the angle $\beta'$ formed by the second inclined surface 114 and the mating surface of the inner race 101. Therefore, the above arrangement of the second sealing lip 109 of the oil seal 104 disclosed is capable of preventing flow of oil, e.g. grease, from the interior Y of the bearing 103 which is filled with oil, but it cannot prevent penetration of dust, etc. from the outer side X of the bearing which is exposed to the atmosphere.

Problems to be Solved by the Invention

The above-mentioned prior art, therefore, suffers from the following problems: Firstly, since substantially only the first sealing lip is arranged to prevent penetration of the dust and similar foreign material from the outer side X of the bearing exposed to the atmosphere, and since the dust or similar foreign material may not be prevented from penetration solely by the first sealing lip, it is impossible to effectively prevent penetration of the dust and other foreign material from the outer side X to the interior Y of the bearing. This is because the second sealing lip is not effective to prevent penetration of the dust or similar foreign material to the interior Y of the bearing which may have entered the cavity between the first and second sealing portions.

Secondly, since the arrangement of the second sealing lip 109 is such that the second sealing lip 109 does not allow the flow of oil, e.g. grease, from the interior Y to the first sealing lip 108, the sealing lip 108 cannot be adequately lubricated, thus leading to wear and damage thereof at an early stage of usage.

SUMMARY OF THE INVENTION

Accordingly, an object of the present invention is to provide a sealing device for a bearing which is capable of effectively preventing penetration of dust from the outer side of the bearing which is exposed to the atmosphere, and of ensuring sufficient lubrication of the sealing lips of the device so as to improve their durability.

To this end, the sealing device for a bearing according to the present invention has a sealing lip portion comprised of a first sealing lip positioned closer to the outer side of the bearing which is exposed to the atmosphere and a second sealing lip positioned closer to the interior of the bearing which is to be filled with oil. The first sealing lip and the second sealing lip are interspaced with an annular cavity formed therebetween, and both lips are provided with a sealing portion formed at its respective apex by the intersection between a first inclined surface and a second inclined surface, both of which are inclined with respect to the axis of rotation of the bearing. The inclined surfaces of the first and second sealing lips, together with the mating peripheral surface of the inner race 3 form the included angles $\alpha$ and $\beta$. The included angles $\alpha$ of the first and second sealing lips open toward the outer side of the bearing, and the included angles $\beta$ of the first an second sealing lips open toward the interior of the bearing.

In each of the above first and second sealing lips, the angle $\alpha$ formed by the first inclined surface and the mating peripheral surface of the inner race of the bearing is set at a value larger than the angle $\beta$ formed by the second inclined surface and the mating peripheral surface of the inner race.

The second sealing lip is provided with an axially hollowed annular recess which is formed in a lateral surface portion thereof at the back of the sealing portion thereof and face the annual cavity. Further, the said second sealing lip is provided with a radially hollowed annular recess formed in a lateral surface portion thereof at the back of said second sealing portion. Said radially hollowed annular recess is positioned axially inwardly from the axial center of said second sealing portion and receives an annular spring member therein.

DESCRIPTION OF THE PREFERRED EMBODIMENTS

Figure 1:
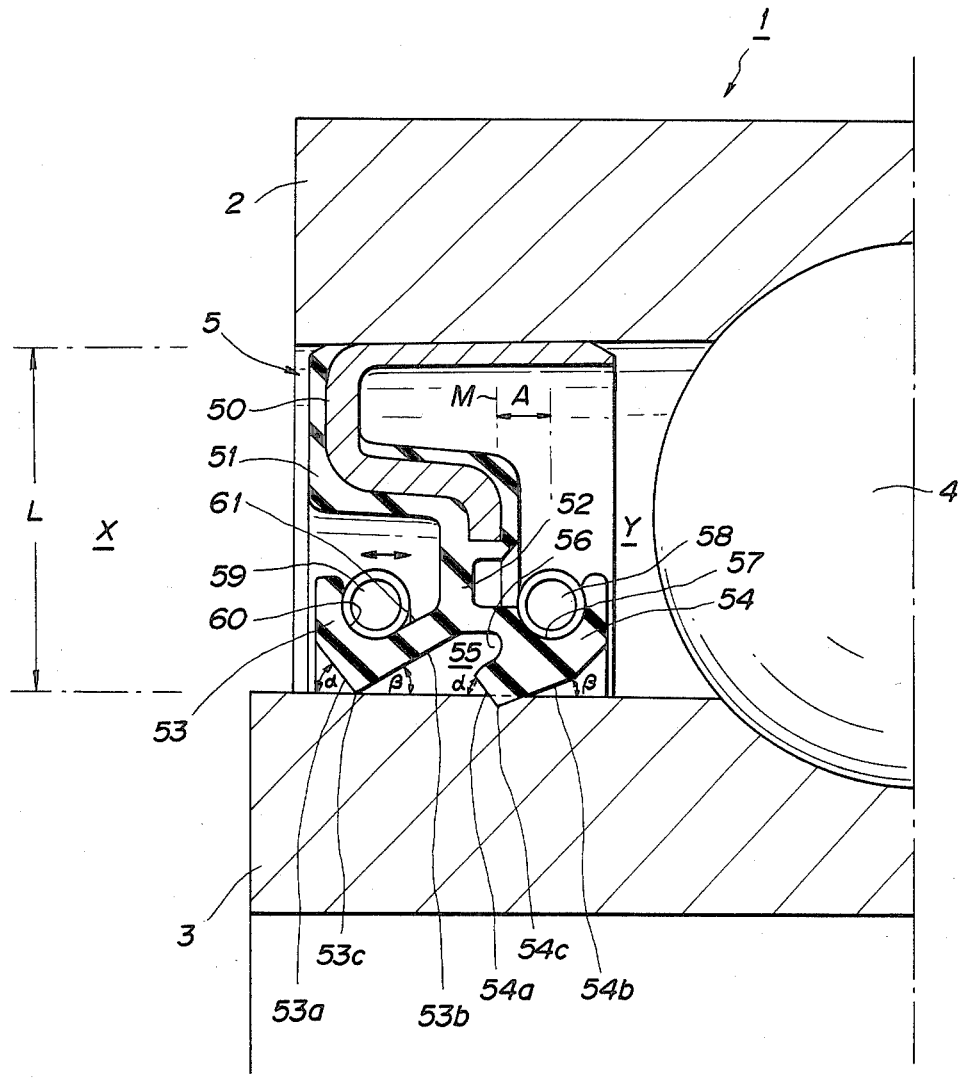
FIG. 1 is a cross sectional view of an essential part of a bearing which is provided with a sealing device according to a first embodiment of the invention.

Preferred embodiments of the invention will be described hereinunder with reference to the drawings. Referring to FIG. 1, reference numeral 1 denotes a bearing comprising an outer race 2, an inner race 3 arranged parallel to the outer race with a predetermined gap L therebetween, and an optimum number of balls 4 interposed between the races 2 and 3. An oil seal 5 of the type which has a radially outer periphery made of metal is force fitted into the gap L between the races 2 and 3. The oil seal 5 comprises a metal reinforcing ring 50 having an annular shape and a generally U-shaped cross section, and a seal body 51 made of a rubbery elastic material which is heat-bonded to the ring 50. The seal body 51 is formed integrally with a sealing lip portion 52 also made of a rubbery elastic material which extends radially inwardly. The sealing lip portion 52 is comprised of a first sealing lip 53 obliquely extending toward the outer side X of the bearing 1 which is exposed to the atmosphere, and a second sealing lip 54 obliquely extending in the opposite direction toward the interior Y of the bearing 1 which is to be filled with oil. Between the first and second sealing lips 53 and 54, an annular cavity 55 is defined which has a closed cross section.

The first and second sealing lips 53 and 54 are provided with respective sealing portions 53c and 54c. The sealing portion 53c and the sealing portion 54c are formed by respective intersections between respective first inclined surfaces 53a and 54a which are inclined with respect to the axis of rotation of the bearing 1, and respective second inclined surfaces 53b and 54b which are also inclined with respect to the axis of rotation of the bearing 1. These first inclined surfaces 53a and 54a, and second inclined surfaces 53b and 54b face the outer peripheral surface of the inner race 3 to form with that surface the included angles $\alpha$ and $\beta$. The included angles $\alpha$ formed by the first inclined surfaces 53a and 54a and the mating outer peripheral surfaces of the inner race 3 open toward the outer side X of the bearing 1, and the included angles $\beta$ formed by the second inclined surfaces 53b ad 54b and the mating outer peripheral surfaces of the inner race 3 open toward the interior Y of the bearing 1. The included angles $\alpha$ are set at values which are larger than the included angles $\beta$ so that the relationship $\alpha > \beta$ stands.

The second sealing lip 54 is provided with an axially hollowed annular recess 56 being formed in a lateral surface portion thereof at the back or rear of the sealing portion 54c and facing the annular cavity 55. The annular recess 56 extends axially inwardly beyond a virtual line M passing through the axial center of the sealing portion 54c. Further, the second sealing lip 54 is formed in an outer surface portion thereof at the back or rear of the sealing portion 54c and facing an upper (as viewed in FIG. 1) space forming part of the interior Y of the bearing 1, with a radially hollowed annular recess 57 which is positioned at an axially inward location of the line M and which receives an annular spring member 58. Therefore, the annular spring member 58 received in the annular recess 57 is positioned at a location which is axially inwardly spaced from the line M by a distance A.

On the other hand, the first sealing lip 53 has an annular spring member 59 in a spring-receiving recess 60 formed in an outer surface portion of the first sealing lip 53 which is positioned at the back or rear of the sealing portion 53c and facing an upper (as viewed in FIG. 1) space forming part of the exterior X of the bearing 1. The spring-receiving recess 60 has a slope surface 61 for allowing the spring member 59 to move axially inwardly.

In order to mount the oil seal 5 which is structured as described above onto the bearing 1, after inserting the balls 4 (which are, for instance, steel balls) between the outer race 2 which is connected to an element (not shown) and thus kept stationary and the inner race 3 which is fixed to a driving shaft (not shown) and is thus rotatable, the oil seal 5 is fitted in the gap between the races 2 and 3 so that the interior Y of the bearing 1 is sealed off from the atmosphere. Further, the interior Y of the bearing 1 is filled with lubricant such as grease by a suitable method, thereby completing the assembly.

In the bearing 1 on which the oil seal 5 is thus mounted, since both the first and second sealing lips 53 and 54 are arranged such that the included angles $\alpha$ which open toward the outer side X of the bearing 1, and are larger than the included angles $\beta$ which open toward the interior Y of the bearing 1, it is possible to positively prevent penetration of dust from the outer side X of the bearing 1 which is exposed to the atmosphere. Further, since the second sealing lip 54 is provided in the vicinity of the sealing portion 54c thereof with the annular recess 56 which extends axially inwardly, the apex of the second sealing lip 54 can be easily deformed in the radially outward direction, thereby facilitating the supply of the grease in the interior Y of the bearing 1 to the annular cavity 55.

Furthermore, in the bearing 1 provided with the oil seal 5 of the invention, since the first sealing lip 53 is provided in its radially outward outer surface portion with the slope surface 61 which allows an easy axially inward movement of the annular spring member 59, the spring member 59 can be displaced in the axially inward direction. Also, the annular spring member 58 is received in the radially outward outer surface of the second sealing lip 54 in such a manner that the spring member 58 is positioned axially inwardly of the sealing portion 54c. Therefore, the axially inward displaceability of the spring member 59 and the relatively axially inward position of the spring member 58 make it possible for the apexes of the first and second sealing lips 53 and 54 to be bent or displaced in the clockwise direction. Consequently, even when the inner race 3 is not arranged with perfect parallelism relative to the outer race 2 due to any assembling error that might be caused by employing an insufficient degree of precision when fixing the inner race 3 to the rotation shaft (not shown), one of the first and second sealing lips 53 and 54 will be displaced in correspondence with the assembling error so as to suitably compensate for the same, thereby always bringing the first and second sealing lips 53 and 54 into sealing contact with the outer peripheral surface of the inner race 3 with an adequate contact force. This not only prevents one-sided wear of the sealing lips 53 and 54, but also facilitates assembly of the rotation shaft or the inner races.

Still further, since the bottom of the spring-receiving recess 60 of the first sealing lip 53 has the slope surface 61, when the annular spring member 59 is axially inwardly displaced along the slope surface 61 by eccentric motion of the inner race 3, part of the second inclined surface 53b of the first sealing lip 53 defining the annular cavity 55 will be depressed inwardly toward the inner race 3, thus decreasing the volume of the cavity 55. Pumping action is created ensuring discharge of dust or the like which has penetrated into the cavity 55 and which would contaminate the grease therein. More specifically, the internal pressure of the cavity increases so as to positively discharge the dust which has penetrated from the outer side X of the bearing 1. On the other hand, when the spring member 59 returns to the initial position, a negative pressure prevails in the cavity 55. On this occasion, since the first sealing lip 53 has a tendency to close, and the second sealing lip 54 has a tendency to open, dust in the atmosphere will not penetrate into the cavity 55 from the outer side X, but grease in the interior Y will flow therefrom to the cavity 55. The above actions (the pumping action) will repeatedly take place in synchronism with rotation of the inner race 3.

Figure 2:
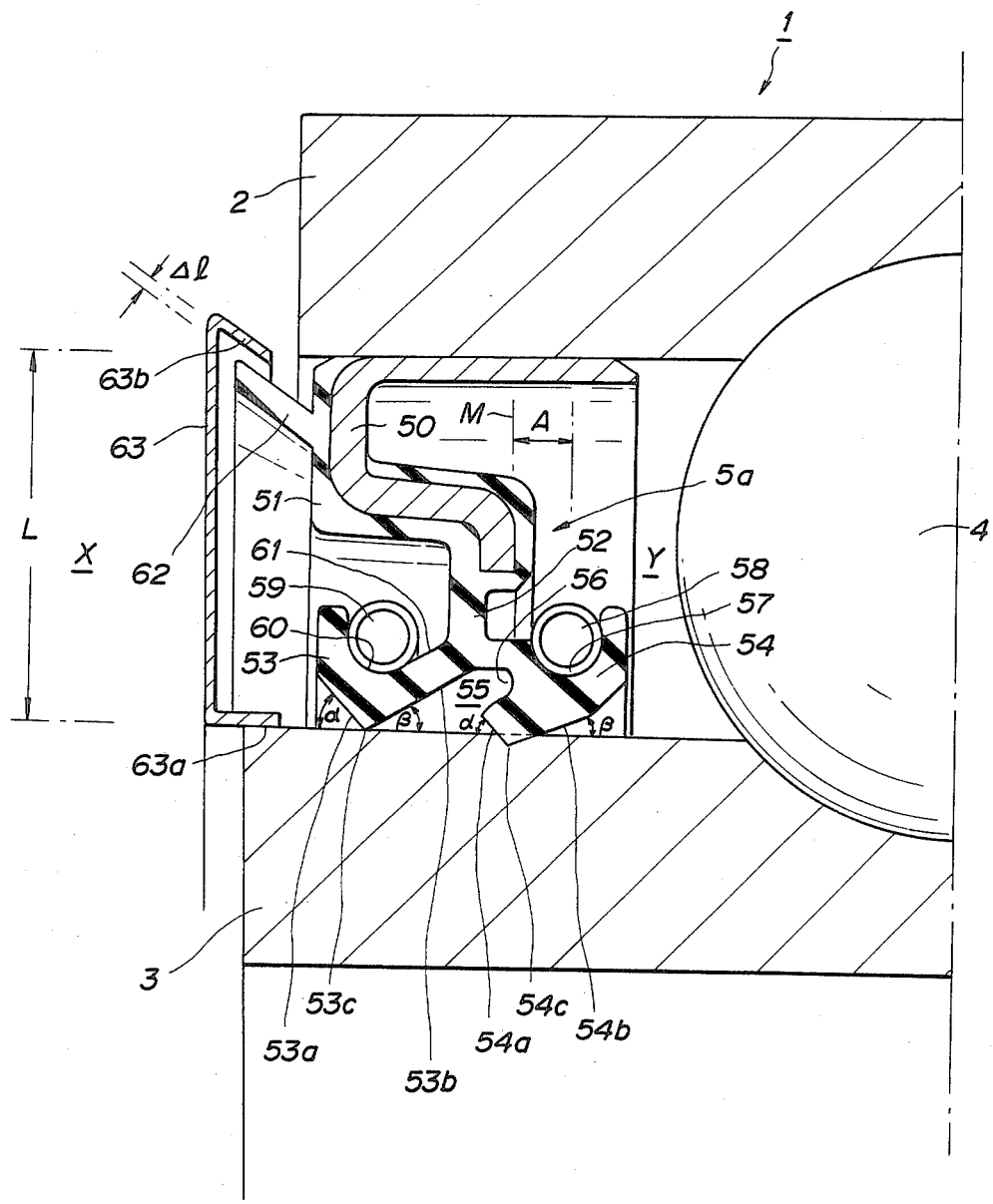
FIG. 2 is a cross sectional view of an essential part of a bearing which is provided with a sealing device according to a second embodiment of the invention.
Figure 3:
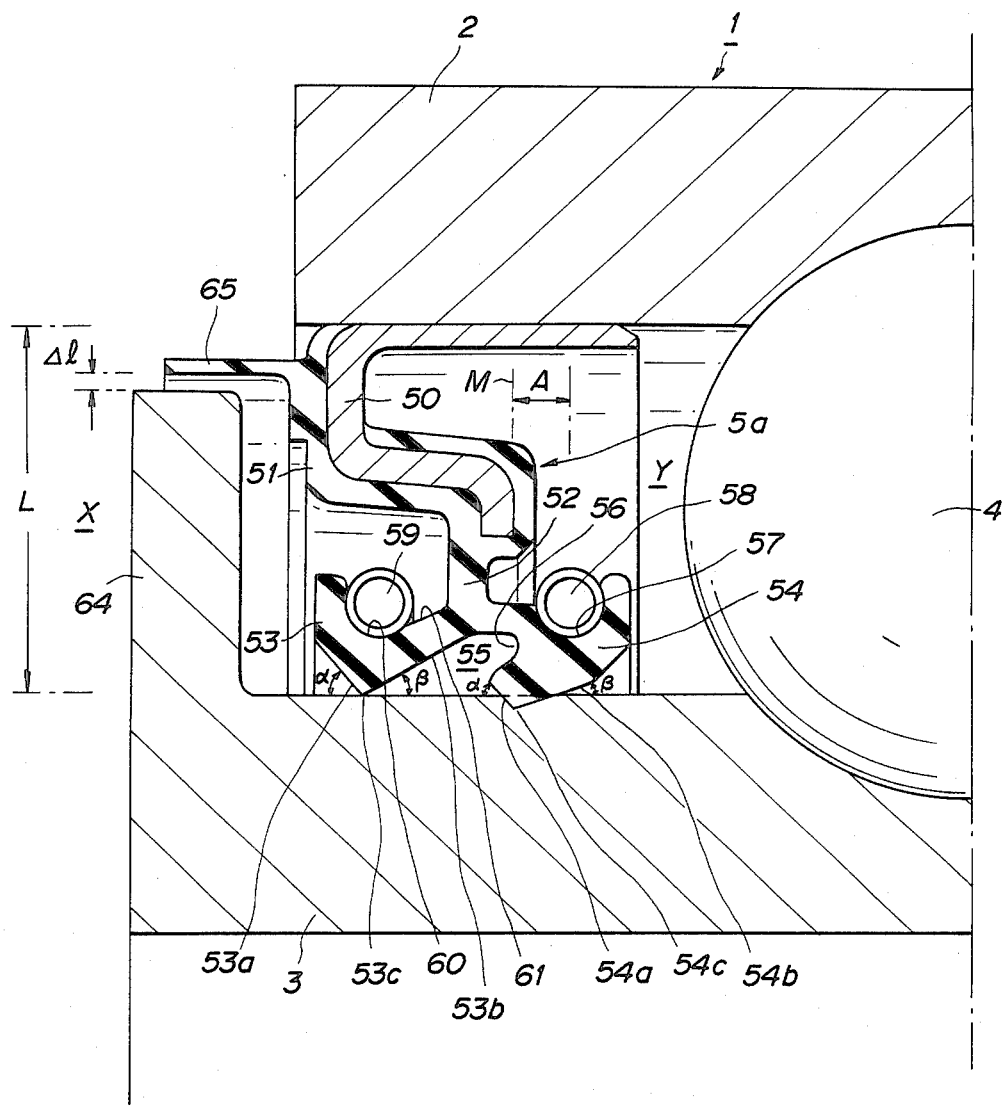
FIG. 3 is a cross sectional view of an essential part of a bearing which is provided with a sealing device according to a third embodiment of the invention.
Figure 4:
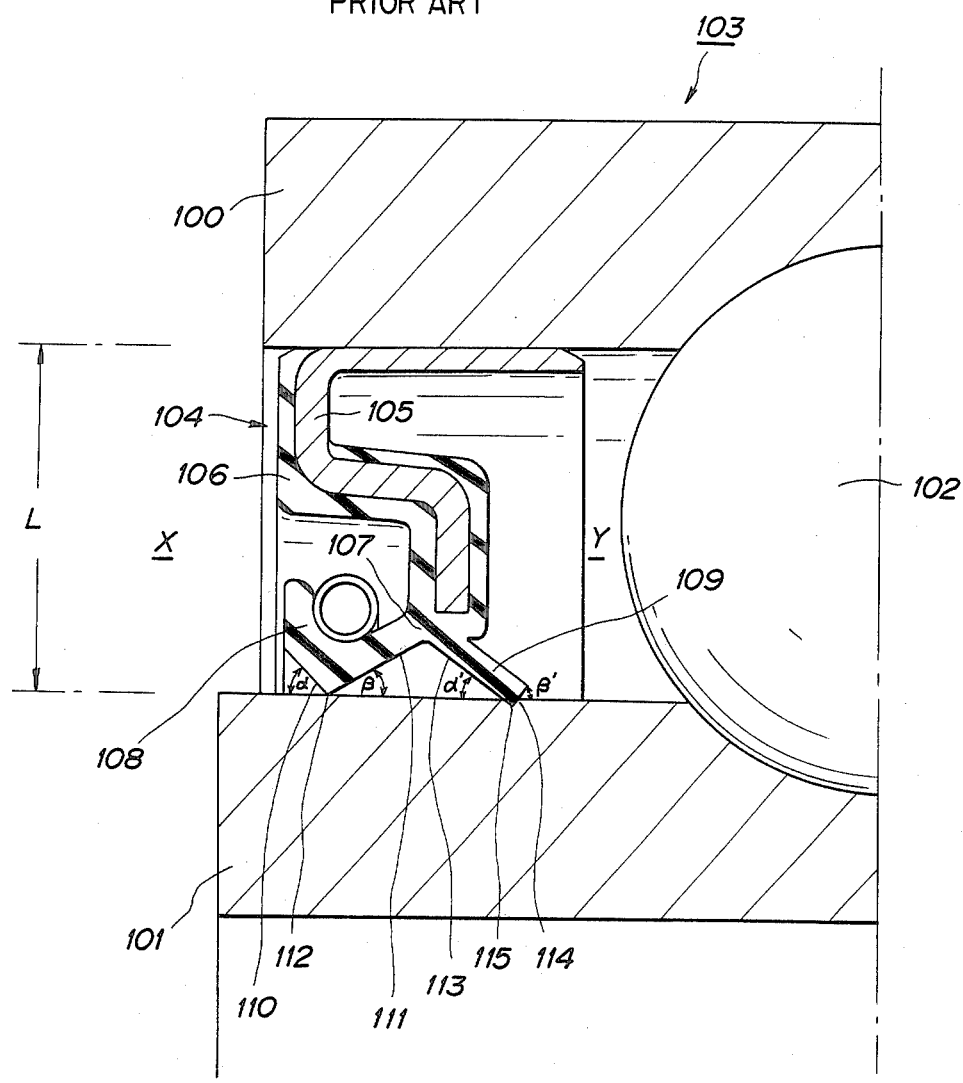
FIG. 4 is a similar view to those in FIGS. 1 to 3 showing a conventional sealing device for bearings.

FIGS. 2 and 3 respectively show second and third embodiments of the sealing device for bearings according to the invention. In these figures, components and elements corresponding to those shown in FIG. 1 are denoted by the same reference numerals. In the second embodiment, as shown in FIG. 2, the seal body 51 of the oil seal 5a has an annular dust lip 62 which obliquely extends in the radially outward direction and is formed at the end of the seal body 51 which is exposed to the atmosphere. A dust-proof cover 63 is fitted axially outwardly of the oil seal 5a in the gap L between the outer race 2 and the inner race 3 in such a manner that one end 63a of the cover 63 is in sealing contact with the outer peripheral surface of the inner race 3 and the other end 63b overlaps part of the outer peripheral surface of the dust lip 62 so as to cover the same part. Therefore, according to this embodiment of the invention, a small gap Δl is provided between the dust lip 62 which is connected to the stationary outer race 2 and the dust-proof cover 63 which is connected to the rotatable inner race 3. If the gap Δl is provided so as to form a fine passage having a labyrinth seal effect, it is possible to effectively prevent penetration of dust from the outer side X of the bearing 1.

In the third embodiment of the invention shown in FIG. 3, the inner race 3 has a flange 64 which extends radially outwardly from the axially outer end of the inner race 3. The seal body 51 has a dust lip 65 which extends axially outwardly from the end of the seal body 51 exposed to the atmosphere. A small gap Δl is provided between the flange 64 and the dust lip 65 which are disposed such as to face each other, so as to effectively prevent penetration of dust.

By virtue of the above arrangements and operations, the sealing device according to the invention has the following advantages: Since penetration of dust into the interior of the bearing can be positively prevented, the balls arranged in the bearing will not suffer from drag, and it is, therefore, possible to eliminate sliding resistance between the various component parts of the bearing as well as damage of the same, thereby ensuring smooth operation of the bearing over long periods of use. Further, since both sealing portions of the sealing lips can be supplied with lubricant so as to adequately lubricate the sealing portions, it is possible to eliminate early wear and damage of the sealing lips due to seizing of the same or the like, thereby remarkably improving the durability of the sealing lips and the oil seal.

What is claimed is:

1. A sealing device adapted to be fitted between an outer race and inner race of a bearing, said sealing device including a sealing lip portion having a first sealing lip and a second sealing lip, said first and second sealing lips being spaced apart along the rotational axis of said bearing, said first sealing lip positioned closer to an outer side of said bearing which is exposed to ambient conditions and said second sealing lip positioned closer to an interior of said bearing adapted to be filled with oil, said first sealing lip provided with a first sealing portion and said second sealing lip provided with a second sealing portion, each said sealing portions being formed by the intersection of a first and second surface of said first and second sealing lips inclined with respect to said axis of rotation of said bearing, each said inclined surface and a peripheral surface of said inner race substantially parallel to said axis forming an included angle wherein the included angles adjacent said first inclined surfaces open toward said outer side of said bearing and the included angles adjacent said second inclined surfaces open toward said interior of said bearing; characterized in that said included angle formed by said first inclined surfaces is set at a value larger than the value of said included angle formed by said second inclined surfaces, and said second sealing lip including an axially hollowed annular recess, said recess being formed in a lateral surface portion at a back of said second sealing portion.

2. The sealing device according to claim 1, wherein said second sealing lip includes a radially hollowed annular recess, said recess being formed in a lateral surface portion at a back of said second sealing portion, said radially hollowed annular recess being positioned axially inwardly from an axial center of said second sealing portion, and further including an annular spring member received in said recess.

3. The sealing device according to claim 1, wherein said first sealing lip includes a recess formed in a lateral surface portion thereof at the back of said first sealing portion, said recess having a slope surface, and further including an annular spring received in said recess, said spring being capable of axial movement along said slope surface.

4. The sealing device according to claim 2, wherein said first sealing lip includes a recess formed in a lateral surface portion thereof at the back of said first sealing portion, said recess having a slope surface, and further including an annular spring received in said recess, said spring being capable of axial movement along said slope surface.

5. The sealing device according to any one of claims 1 to 3 or 4, further including an annular dust lip obliquely extending in a radially outward direction from an outer end of said sealing lip portion, and a cover fitted between said outer and inner races in such a manner that one end of said cover is in sealing contact with said peripheral surface of said inner race and the other end of said cover overlaps a portion of an outer peripheral surface of said dust lip thereby to provide a gap therebetween.

6. The sealing device according to any one of claims 1 to 3 or 4, further including an annular dust lip extending in an axially outward direction from an outer end of said sealing lip portion, and a flange portion, said flange portion including a first end integral with said inner race and extending from an axial outer end of said inner race in a radially outward direction to a second end which overlaps part of an inner peripheral surface of said dust lip, said second end and said outer end located to provide a gap therebetween.

* * * * *